(No Model.)
G. M. GITHENS.
TRIPOD FOR ROCK DRILLS.
No. 307,640. Patented Nov. 4, 1884.
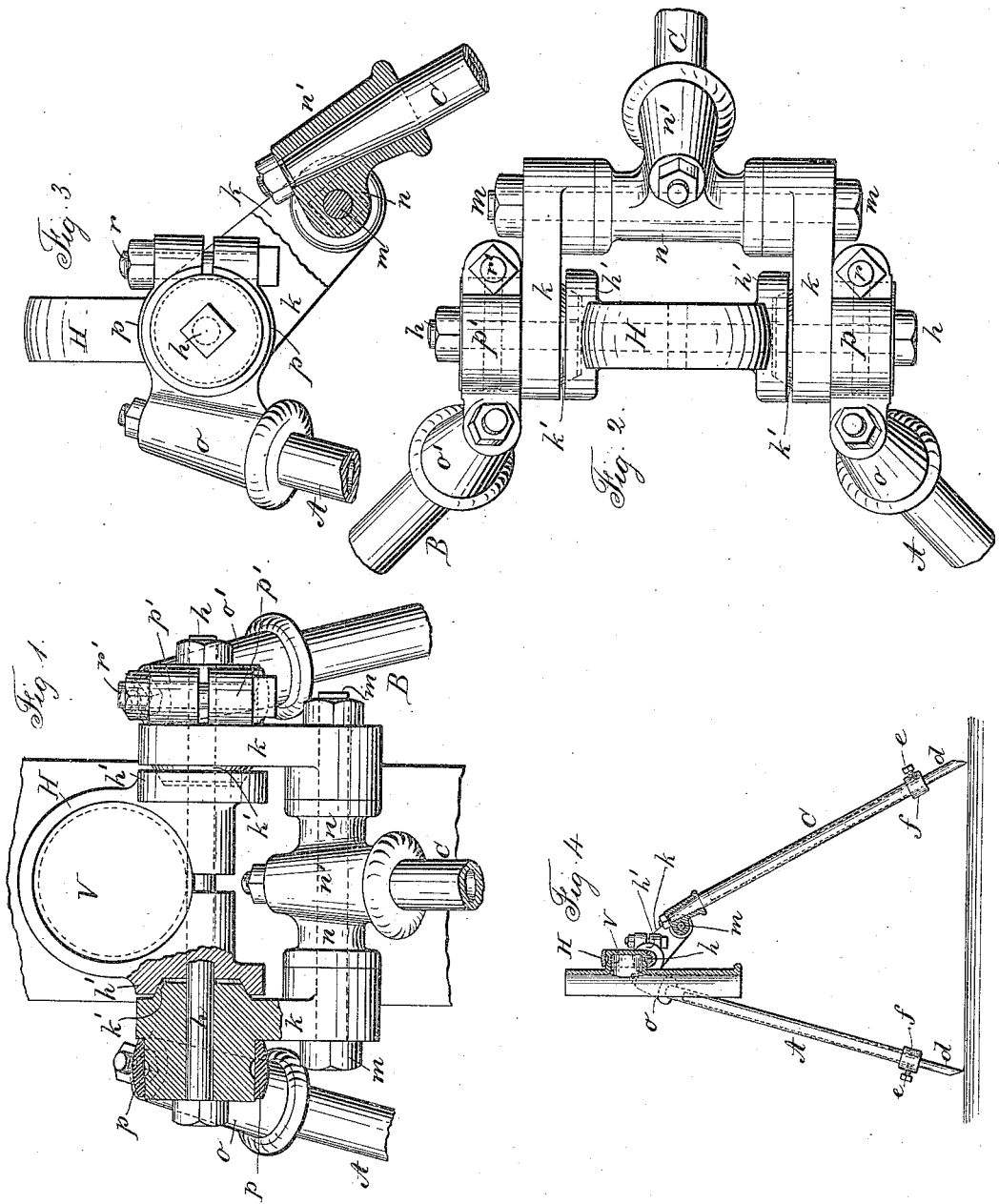

UNITED STATES PATENT OFFICE.

REISSUED

GEORGE M. GITHENS, OF BROOKLYN, NEW YORK.

TRIPOD FOR ROCK-DRILLS.

SPECIFICATION forming part of Letters Patent No. 307,640, dated November 4, 1884.

Application filed February 18, 1884. (No model.)

*To all whom it may concern:*

Be it known that I, GEORGE M. GITHENS, of Brooklyn, in the county of Kings and State of New York, have invented an Improvement in Tripods for Rock-Drills, of which the following is a specification.

This invention is made for giving greater facilities than heretofore for moving the legs into different positions and securing the same in the most firm and rigid manner, so that the rock-drill cylinder held thereby can be placed in any desired position in relation to such tripod.

In the drawings, Figure 1 is an elevation, partly in section, of the tripod and hub. Fig. 2 is a plan of the joints at the upper ends of the tripod. Fig. 3 is a side view, partially in section, of the same; and Fig. 4 is a sectional side elevation of the tripod and hub of the steam rock-drill in smaller size.

The two front legs, A B, and the rear leg, C, are each made as a tube, with an extension-rod, *d*, therein that may be set at any desired length and clamped by the bolt *e* in the band *f*, and usually there are movable weights that can be placed upon the legs to keep the instrument from moving under the reciprocation of the drill. These parts are of ordinary character, except that the upper end of each tube is forged solid with a bolt or bar inserted into the tube, the exterior being tapering or conical, and provided with a screw and nut at the end, and each socket is tapering, so that the end of the tubular leg fits firmly therein, and the concussion will not produce any looseness of the leg in its socket, as the parts wedge tightly together and the nut is set up from time to time.

The cylinder of the steam rock-drill is provided with a cylindrical hub, *v*, around the periphery of which is a groove, and the split band H is adapted to fit around this hub *v*. The bolt *h*, that is used to clamp this split band to the hub, is passed across so as to enter this groove at one side, thereby preventing the ring separating from the hub, but allowing the hub to be turned around in the ring H.

At the sides of the split band H there are the hubs *h'*, with circular conical recesses for the reception of similar-shaped projections *k'* upon the link-pieces *k*. The bolt *h* passes through these link-pieces, and by screwing the same up the link-pieces *k* are clamped in the most firm and reliable manner to the split band H. In this manner the bolt *h* performs the threefold duty of clamping the band to the cylinder, preventing the band separating from the cylinder, and clamping the links.

At the ends of the links *k* there is a bolt, *m*, passing through such links and through the stock *n* of the socket *n'*, which receives the upper end of the back leg, C. The ends of the stock *n* may enter tapering recesses in the faces of the links *k*, so as to make a very firm connection for the back leg when the bolt *m* is tightened up. Each link *k* is provided with a cylindrical projection or trunnion at one side, around the bolt *h*, and this is grooved peripherally. The sockets *o* and *o'* of the front legs are provided with split bands *p p'*, adapted to fit around the respective trunnions, the clamp-screws *r r'* of the respective split bands pass at one side into the peripheral groove, so as to prevent the parts separating, and by tightening such bolts after the respective legs have been moved to their places the split bands will clamp the trunnions in the most firm and reliable manner.

I do not claim either of the separate parts, as I am aware that a split band with a bolt has been applied to a screw-head grooved circumferentially, and I am aware that wooden legs have been tapered and made with a screw at the end, and that tubular legs have been used. By my improvement the clamping-screw is made to hold the clamp upon the trunnion, to clamp the trunnion, and to clamp the links simultaneously.

I claim as my invention—

1. The combination, with the hub or trunnion with a peripheral groove for supporting the rock-drill, of a split band, a clamping-bolt passing across at the open portion of such split band and into the peripheral groove of the trunnion, and links through which such bolt passes, and the legs and connecting-pieces between the legs and the respective links and bolts, substantially as set forth.

2. The combination, with the split ring H and the bolt *h*, of the links *k k'*, through which the bolt *h* passes, the leg *c*, connected to such links, the trunnions upon such links, the sockets *o o'*, the legs A B, fitting such sockets, the split rings $p\ p'$, and the bolts $r\ r'$, substantially as set forth.

3. The tubular metallic tripod-legs, each closed at its upper end and made conical, and terminating with a screw and nut, in combination with the conical metallic sockets through which the closed portions of the legs pass, and are held by the nuts, and the connections between the sockets, substantially as set forth.

4. The trunnion having a peripheral groove and forming a support for the rock-drill and its connected parts, and the legs for such drill, in combination with a split band and a clamping-bolt passing through the split band and into the peripheral groove, for holding the split band to the trunnion, the links, the connections between the legs and links, and the bolts for clamping the same, substantially as set forth.

Signed by me this 13th day of February, A. D. 1884.

GEO. M. GITHENS.

Witnesses:
GEO. T. PINCKNEY,
WILLIAM G. MOTT.